(12) United States Patent
Gaitan et al.

(10) Patent No.: US 6,171,880 B1
(45) Date of Patent: Jan. 9, 2001

(54) METHOD OF MANUFACTURE OF CONVECTIVE ACCELEROMETERS

(75) Inventors: Michael Gaitan, North Potomac, MD (US); Nim Tea, Skokie, IL (US); Edwin D. Bowen, Ramona; Veljko Milanovic, Berkeley, both of CA (US)

(73) Assignee: The United States of America as represented by the Secretary of Commerce, Washington, DC (US)

( * ) Notice: Under 35 U.S.C. 154(b), the term of this patent shall be extended for 0 days.

(21) Appl. No.: 09/332,112

(22) Filed: Jun. 14, 1999

(51) Int. Cl.$^7$ .................................................. H01L 21/00
(52) U.S. Cl. .............................. 438/52; 438/50; 438/51; 438/54; 438/55; 257/419; 257/420
(58) Field of Search .................... 438/48, 49, 50, 438/51, 52, 53, 59; 257/417, 419, 420

(56) References Cited

U.S. PATENT DOCUMENTS

| | | |
|---|---|---|
| 2,455,394 | 12/1948 | Webber . |
| 2,554,512 | 5/1951 | Varian . |
| 3,241,374 | 3/1966 | Menkis . |
| 4,682,503 * | 7/1987 | Higashi et al. ........................ 73/755 |
| 4,696,188 * | 9/1987 | Higashi ................................. 73/204 |
| 4,739,657 * | 4/1988 | Higashi et al. ........................ 73/204 |
| 4,782,708 * | 11/1988 | Harrington et al. ............... 73/861.05 |
| 5,581,034 * | 12/1996 | Dao et al. ........................... 73/514.09 |
| 5,682,053 * | 10/1997 | Wiszniewski ........................ 257/401 |
| 5,719,333 | 2/1998 | Hosoi et all. . |
| 5,793,073 * | 8/1998 | Kaminishi et al. .................. 257/254 |
| 5,801,070 * | 9/1998 | Zanini-Fisher et al. ............... 438/54 |
| 5,861,092 * | 1/1999 | Kiyota et al. ........................ 205/781 |
| 5,879,630 * | 3/1999 | Lescouzeres et al. ............ 422/82.02 |
| 5,911,896 * | 6/1999 | Holden et al. ....................... 219/390 |
| 5,949,119 * | 9/1999 | Vilain .................................. 257/420 |
| 5,998,816 * | 12/1999 | Nakaki et al. ....................... 257/254 |

* cited by examiner

*Primary Examiner*—John F. Niebling
*Assistant Examiner*—Viktor Simkovic
(74) *Attorney, Agent, or Firm*—Larson & Taylor, PLC

(57) ABSTRACT

A method is provided for the manufacture of a convective accelerometer and tilt sensor device using CMOS techniques. An integrated circuit chip is produced which includes a silicon substrate having an integrated circuit pattern thereon including a heater element located centrally of the substrate and at least first and second thermocouple elements located on the substrate on opposite sides of the heater element. Thereafter, portions of the substrate surrounding and beneath the heater and thermocouple elements are etched away to suspend the element on the substrate and thus to thermally isolate the elements from the substrate. The substrate is etched up to the cold thermocouple junction of the thermocouple elements so the cold junction remains on the substrate.

16 Claims, 2 Drawing Sheets

METHOD OF MANUFACTURE OF CONVECTIVE ACCELEROMETERS

FIELD OF THE INVENTION

The present invention relates to an improved method of making convector accelerometers and tilt sensors using complementary metal-oxide semiconductor (CMOS) technology.

BACKGROUND OF THE INVENTION

Miniaturization and integration of accelerometers in standard integrated circuit (IC) processes has been the topic of extensive research (see J. Bausells, J. Carrabina, A. Merlos, S. Bota, and J. Samitier, Mechanical sensors integrated in a commercial CMOS technology, Physical Proceedings of the 1996 EUROSENSORS Conference, Part 3 (of 3) Sep. 8–11 1996, Vol. 62, no. 1–3, pt. 3, 1997; G. A. MacDonald, Review of low cost accelerometers for vehicle dynamics, Sensors and Actuators, A, vol. 21, no. 1–3, Pt 2, 1990; H. Seidel, U. Fritsch, R. Gottiner, J. Schalk, J. Walter, and K. Ambaum, Piezoresistive silicon accelerometer with monolithically integrated CMOS-circuitry, Proceedings of the 1995 Eurosensors Conference, Stockholm, Sweden, Part 1, 1995). In most cases, accelerometer structures involve a solid proof mass which is allowed to move under accelerating conditions. This approach has many disadvantages. One key disadvantage is the difficulty of processing of such components in IC technologies inherently unsuited for these components.

More recently, micromachining techniques have brought about many novel miniaturized accelerometer structures, although the fabrication process includes many masks and etching steps. One aspect of the invention concerns the integration of accelerometer devices in CMOS technology, where on-chip drive and sense circuitry is available, and overall costs are lower. Because of these advantages of CMOS technology, many other classes of sensors have been implemented in CMOS by simple post-processing micromachining (see N. H. Tea, V. Milanovi, C. A. Zincke, J. S. Suehle, M. Gaitan, M. E. Zaghloul, and J. Geist, Hybrid Post-processing Etching for CMOS-compatible MEMS, Journal of Microelectromechanical Systems, vol. 6, no. 4, pp. 363–372, Dec. 1997; C. Zincke, V. Milanovi, M. E. Zaghloul, Microelectromechanical Systems Integration in Standard CMOS, Proceed. of 8th International Conference on Microelectronics, ICM96, Cairo, Egypt, 1996; d. Moser, H. Baltes, High sensitivity CMOS gas flow sensor on a thin dielectric membrane, Sensors and Actuators, A: Physical Proceedings of EUROSENSORS VI, vol. 37–38, no. 2, pp 33–37; 1993).

Recently, a new concept and a class of devices for acceleration and tilt sensing were developed as disclosed in U.S. Pat. No. 5,581,034 to Dao et al. The devices require no solid proof mass, and instead the operation of the devices depends on the effect of acceleration on the natural heat convection from heated resistive wires in a gas surrounding the device. In such a device, the sensor is hermetically packaged to deny any influence of external airflow on the gas inside. An implementation of this device by custom fabrication on a silicon substrate is discussed in Leung et al (A. M. Leung, J. Jones, E. Czyzewska, J. Chen, and M. Pascal), Micromachined Accelerometer with no Proof Mass, Technical Digest of Int. Electron Device Meeting (IEDM97), pp. 899–902, Dec. 97. Although the implementation discussed in this reference is a step toward miniaturization and integration, the proposed devices require custom fabrication, and only sensitivity to tilting is discussed in the reference.

In addition to the Dao et al patent, the patented prior art includes the following U.S. Pat. Nos. 2,445,394; 2,554,512; 3,241,374; and 5,719,333. Briefly considering these patents, U.S. Pat. No. 2,445,394 to Webber discloses a convective accelerometer comprising a fluid filled envelope within which is mounted a resistance element with a high temperature coefficient of resistivity. The resistance element can be used to create the thermal convective stream or, alternatively, additional means can be employed for this purpose. U.S. Pat. No. 2,554,512 to Varian discloses an accelerometer based on the resistance of a filament of electrically conducting material. The filament has a high temperature coefficient of resistivity. An electric current passes through the filament, heating the surrounding gas, and creates a convection current. A change in acceleration will affect the rate of heat removal from the filament and proportionally change the filament resistivity. The accelerometer is primarily designed to measure angular acceleration and acceleration in the direction of gravity. U.S. Pat. No. 3,241,374 to Menkis discloses an accelerometer comprising a gas-filled enclosure also containing a heater and a pair of heat receivers. The heat receivers are positioned on opposite sides of the heater, along a line which acceleration of the enclosure may have a component. The heat receivers are electrically connected such that when at the same temperature they yield a composite output voltage of zero. U.S. Pat. No. 5,719,333 to Hosoi et al. discloses an accelerometer constructed by etching a semiconductor board using a photoengraving process. Two sensor cases are joined to form a cavity wherein a heater and a temperature-sensing resistor element are placed. Acceleration effects the temperature distribution within the closed space, changing the resistivity of the temperature-sensing resistor element.

Returning to the Dao et al. patent which was briefly discussed above, this patent discloses a convective accelerometer comprising, in one preferred embodiment, a sealed enclosure containing a heating element, two temperature sensing elements, and a gas sealed within the enclosure. The enclosure includes a header assembly with a plurality of posts extending therethrough. Two pairs of the posts serve as a mounting means for the two temperature sensing elements while a further pair of posts serves as a mounting means for the heating element. The temperature sensing elements comprise wires made of a metal, such as nickel, platinum or tungsten, having a relatively high temperature coefficient of resistivity and the heating element is formed as a wire of the same, or a similar, material. The heating and temperature sensing wires are each suspended at the ends thereof between respective pairs of posts.

SUMMARY OF THE INVENTION

In accordance with the invention a convective accelerometer and tilt sensor device is provided which is implemented in a commercial CMOS process to provide monolithic integration of drive, detection and output circuitry with the sensor on a single chip. The capability of fabricating the convective accelerometer device using CMOS technology affords a significant advantage with respect to cost as well as other advantages.

Considering these advantages in more detail, the convective accelerometer and tilt sensor device made by the method of the invention uses thermocouples as the temperature sensing elements. This approach provides significant benefits and, moreover, would be impractical to implement with the techniques such as those disclosed in the Dao et al patent. In this regard, as described above, making of the devices disclosed in the Dao et al patent involves suspending the heating and temperature sensing elements or wires between mounting posts and hence manufacture of these devices is essentially an assembly, as opposed to batch processing, technique, wherein the various elements are mounted one by one on the respective pairs of support posts. Apart from the obvious disadvantages of such a technique from an efficiency standpoint in the large scale manufacture of such devices, the technique would be difficult to carry out, and essentially impractical, when used in mounting a thermocouple junction, i.e., a junction between two dissimilar metals. In contrast, the present invention enables batch fabrication of the sensor devices wherein a very large number of the temperature sensing and heater elements of the devices are first patterned in parallel on a common substrate and the maskless etching operation described below is carried out for all devices at the same time.

In accordance with the invention, a method is provided for the manufacture of a convective accelerometer and tilt sensor device, the method comprising: providing an integrated circuit chip comprising a substrate having an integrated circuit pattern thereon including a heater element located centrally of the substrate and at least first and second thermocouple elements located on the substrate on opposite sides of the heater element; and etching away portions of the substrate surrounding and beneath the heater and thermocouple elements to suspend the elements on the substrate and thus thermally isolate said elements from the substrate.

In one preferred, two-dimensional embodiment, the heater element includes a plurality of heaters arranged in a symmetrical pattern and a thermocouple element is associated with each of the heaters. In an advantageous implementation of this embodiment, the plurality of heaters comprises four heaters arranged in a square configuration and a thermocouple element is arranged opposite to each of the four heaters outwardly thereof.

In a further preferred, one-dimensional embodiment, the heater element comprises a single heater extending completely across the substrate and the etching of the semiconductor substrate comprises using a gaseous isotropic etchant, preferably xenon-difluoride, to perform the etching.

In an alternative implementation, the etching of the substrate comprises using an anisotropic etchant to perform the etching.

The thermocouple elements characteristically include hot and cold thermocouple junctions and, advantageously, the substrate is etched up to the cold thermocouple junction so that the cold thermocouple junction remains on the substrate.

According to a further aspect of the invention, a batch process method of manufacture of convective accelerometer and tilt sensor devices is provided which uses the general method described above.

Further features and advantages of the present invention will be set forth in, or apparent from, the detailed description of preferred embodiments thereof which follows.

BRIEF DESCRIPTION OF THE PREFERRED EMBODIMENTS

DESCRIPTION OF THE PREFERRED EMBODIMENTS

Figure 1:
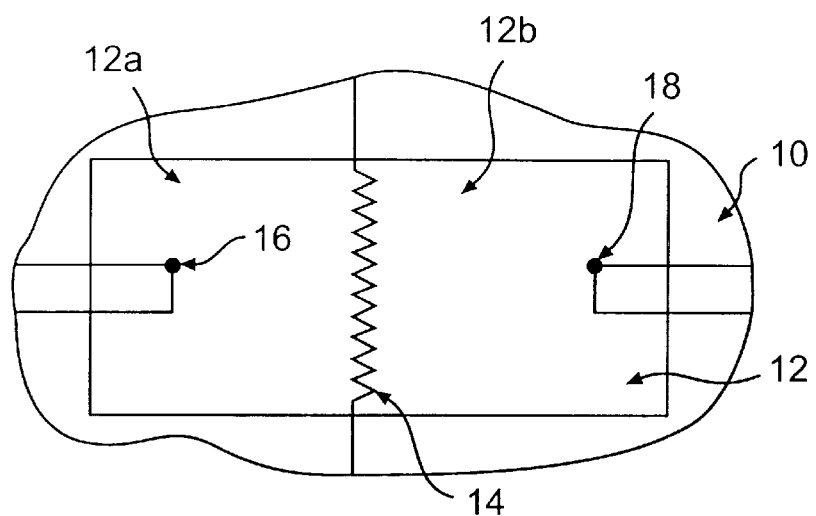
FIG. 1 is a schematic diagram of a one dimensional convection accelerometer and tilt sensor device made in accordance with a first embodiment of the method of invention.

Referring to FIG. 1, there is shown, in a schematic manner, a one dimensional embodiment of the convection accelerometer device of the invention. The device includes, mounted on an IC CMOS chip 10, and suspended above an etched pit or cavity 12, a meandering polysilicon resistor heater or microheater 14 at the center of the cavity 12 and two sets of closely spaced thermocouple junctions 16 and 18 located on chip 10 on opposite sides of heater 14. It will be understood that heater 14 need not be at center of cavity 12 and that other layouts can be employed. The thermocouple junctions 16 and 18 are hot junctions and each is connected in series with a cold junction (not shown) located above the base silicon material of the chip 10. In an advantageous embodiment, a total of twelve thermocouples are connected in series in each temperature sensor to increase the output voltage signal. The suspended microheater 14 preferably comprises a polysilicon resistive heater element encapsulated in the glass of the passivation layer of the IC chip 10 and suspended above cavity 12 to obtain high thermal efficiency. Heater 14 can produce local temperatures of up to 1000K. Although other microheaters can be used, a suitable microheater is the type described and characterized in C. Zincke, Microelectromechanical Heating Element Structure Characterization and Control, Masters Thesis, The George Washington University, 1996. The device is preferably made such that the elements and layers thereof are all part of a standard CMOS construction and thus can be produced by standard CMOS processes, although other materials can be used and, for example, a different heater material, such as tungsten, instead of a polysilicon resistive material, can be employed if increased stability is needed.

In general, in a convective accelerometer, the thermal difference between the heated element and the surrounding gas generates a buoyant force that causes convective flow of the gas. In the operation of the device of FIG. 1, when an acceleration is applied to the device, the inertia of the surrounding gas causes a temperature difference on the two sides of the heater 14, with the convective gas flow (or plume) acting as the proof mass for the accelerometer. This temperature difference is proportional to the applied acceleration and the thermocouple sets 16 and 18 on either side of heater 14 measure a differential output corresponding to the applied acceleration. The final raw output voltage is taken as the difference between the outputs of the thermocouple sets 16 and 18.

Figure 2:
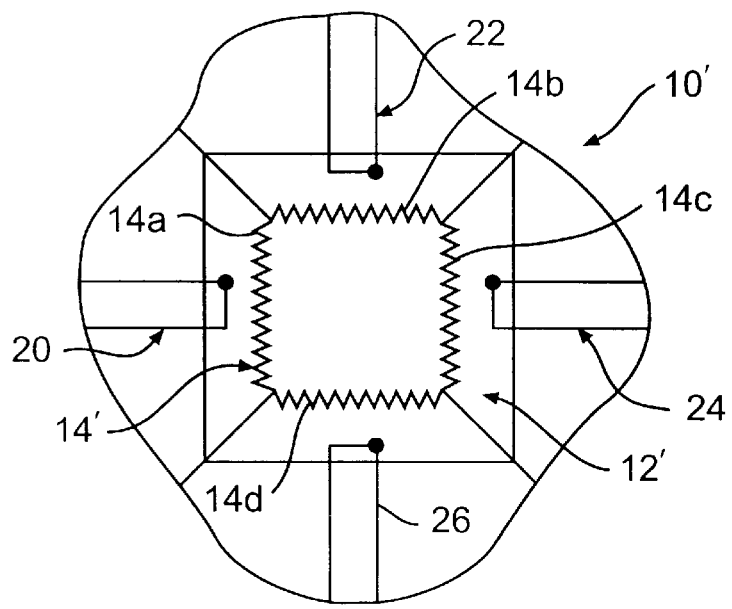
FIG. 2 is a schematic diagram of a two dimensional convection accelerometer and tilt sensor device made in accordance with a second embodiment of the method of the invention.

Referring to FIG. 2, a two-dimensional embodiment of the invention is shown. This embodiment is based on the same principle as the embodiment of FIG. 1 and corresponding elements in FIG. 2 have been given the same reference numerals with primes attached. In the center of a semiconductor chip 10' is a symmetrically designed and suspended microheater 14'. In the embodiment of FIG. 2, the microheater 14' comprises four heating elements 14a, 14b, 14c and 14d arranged in a square configuration as shown. Further, four sets of thermocouples or thermopiles 20, 22, 24 and 26 are provided, two for the differential detection of the temperature difference in each axial direction, i.e., along the X- and Y- axes of the chip. It is noted that a two dimensional sensor device can also be made by further providing an additional one dimensional sensor corresponding to that shown in FIG. 1, but rotated by 90°, so that this sensor, in combination with the sensor of FIG. 1, will provide the requisite two dimensional sensing.

Figure 3A:
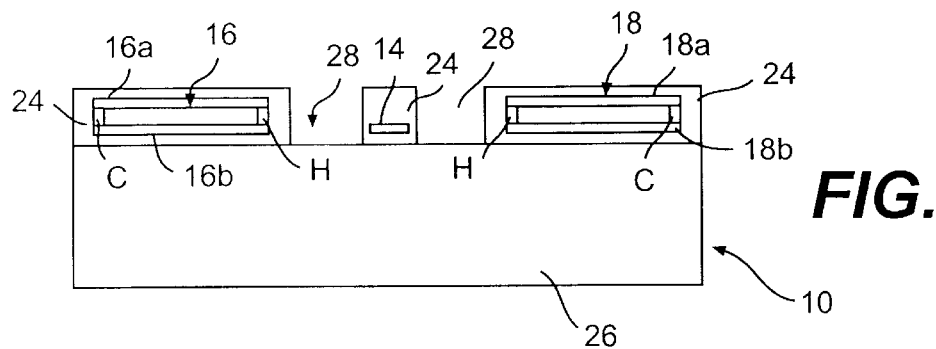
FIG. 3A and 3B are schematic cross sectional views showing two steps in the fabrication of the device of FIG. 1.
Figure 3B:
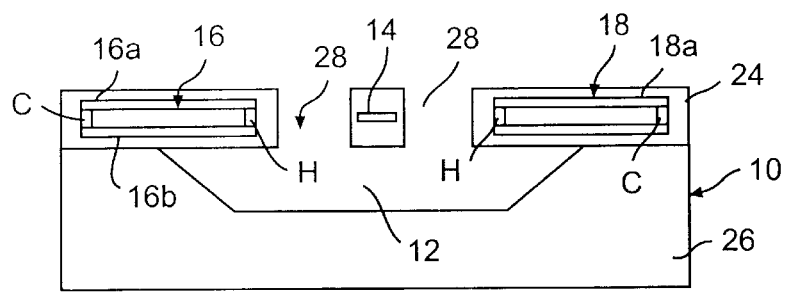
Figure 4:
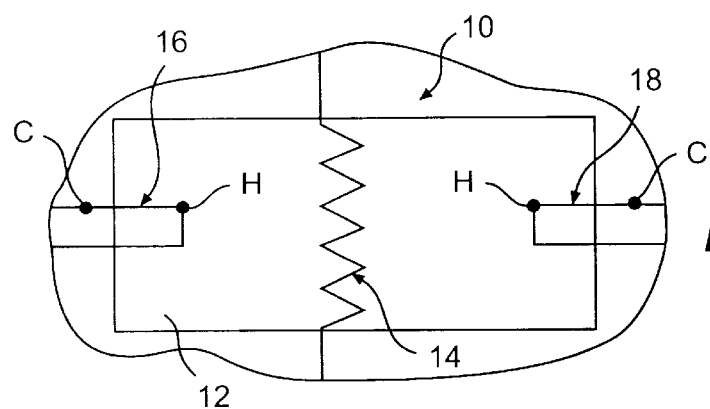
FIG. 4 is a schematic top plan view of a device made in accordance with a further embodiment of the invention.
Figure 5:
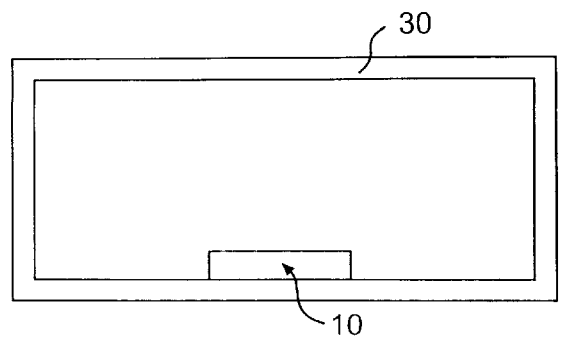
FIG. 5 is a schematic cross sectional view of a final step in the method of the invention.

In a specific example of the sensor fabrication method or process of the invention, chips were fabricated in a double-poly 2 m CMOS n-well operation through the MOSIS service and were subsequently etched in a laboratory. Details of the initial processing are described in the Tea et al article referenced herein above. In general, Refering to FIG. 3A and 3B resistive heater element 14, and thermocouple elements 16, 18 are patterned as an integrated circuit (IC) on the chip 10 as a pre-cursor to the etching step. As shown, and is conventional, the thermocouple elements 16 and 18 are constructed of two thermocouple members 16a and 16b and 18a and 18b, respectively, which are made of different thermocouple materials and which form respective hot junctions H and cold junctions C. The heater element 14 and thermocouple elements 16, 18 are encapsulated in a glass passivation layer 24 formed on the IC substrate 26 of IC chip 10. Standard IC techniques are used and this can be done at a CMOS foundry. The design of the integrated circuit on the chip 10 includes the provision of openings or windows 28 in the glass passivation layer 24 which is a part of the IC chip. These openings or windows 28 serve as etch sites for the etching operation that creates etch cavity 12 and, in essence, the design or pattern created on the chip 10 provides the necessary masking for the etching operation. Thereafter, in a post-processing, micromachining step, shown in FIG. 3B the portions of the chip around and under the heater element 14 and thermocouple elements 16, 18 are micromachined or etched away, in a maskless etching step, so that these elements are suspended on the chip 10 above the etch cavity 12. The etching step is maskless in the sense that no further masking is needed to perform this step other than that provided by the IC patterning, although further masking can, of course, be used if desired or necessary. In the embodiment illustrated in FIG. 3B, and is also shown schematically in FIG. 4, the hot junctions H of thermocouples 16 and 18 are suspended over cavity 12 while the substrate 26 is etched up to the cold junctions C so that the latter remain in the substrate 26.

As described above in connection with the Dao et al patent, a convective accelerometer conventionally includes a sealed enclosure containing a heating element and two temperature sensing elements. In FIG. 1, a sealed enclosure or package 30 is shown which is provided to enclose the IC chip 10 forming the convective accelerometer of the invention, as a final step in the preparation of the overall device.

As shown in FIG. 1, the heater 14 is mounted on chip 10 with glass-cut areas 12a and 12b on both sides thereof. It is noted that because there is no overlap of the open areas 12a and 12b on the opposite sides of heater 14, an anisotropic etch would not result in suspended structures but would instead form two separate etch pits or cavities. For this reason, a gaseous isotropic etchant, preferably xenon-difluoride, is used. After a predetermined time period, typically about 6 minutes (the period it takes to produce 12 pulses of 30 second duration), the silicon substrate structure is entirely suspended, up to the cold thermocouple junctions (not shown) which must remain on the silicon substrate. The resulting devices are suitably thermally isolated from the substrate so as to achieve temperatures as high as 1000K for small input powers (i.e., powers less than 100 mW).

In making the two dimensional device of FIG. 2, in one example, the device was also suspended by isotropic etching to simplify post-processing. However, due to the polygonal glass cut configuration employed, anisotropic etching could also be used. Such anisotropic etching can be carried out using an anisotropic etchant such as ethylene diamine-pyrocatechol-water (EDP). Otherwise, the basic process is the same.

The sensor device of the invention has been used to perform measurements in various applications. In one test thereof, the sensor device was mounted on an optical goniometer and tilted from θ–90° to 90° of angle where θ is an angle between a normal to the chip surface and the gravity vector. For this test, constant power was provided to the heater (14), instead of constant voltage or current, in order to control the instability of the suspended polysilicon resistor forming the heater. Tilt sensor results were a very good fit with the expected sinusoidal trend. Other tests involved the use of a standard vibration exciter or shaker, with an acceleration range from 0 to 8 g and vibration frequencies of 10 Hz to 200 Hz. Another test involved varying the power to the microheater (14) and showed the expected dependence of sensor sensitivity to the change in applied power to the heater.

Although the invention has been described above in relation to preferred embodiments thereof, it will be understood by those skilled in the art that variations and modifications can be effected in these preferred embodiments without departing from the scope and spirit of the invention.

What is claimed is:

1. A method of manufacture of a convective accelerometer and tilt sensor device, said method comprising:
   providing an integrated circuit chip comprising a substrate having an integrated circuit pattern thereon including a heater element located centrally of said substrate and at least first and second thermocouple elements located on said substrate on opposite sides of said heater element; and
   etching away portions of the substrate surrounding and beneath the heater and thermocouple elements to form a cavity therebeneath to suspend said element on said substrate so as to thermally isolate said elements from the substrate and so that an air gaD contiguous with said cavity is formed between said heater element and each of said thermocouple elements.

2. A method of manufacture according to claim 1 wherein said heater element includes a plurality of heaters arranged in a symmetrical pattem and wherein a thermocouple element is associated with each of said heaters.

3. A method of manufacture according to claim 2 wherein said plurality of heaters comprises four heaters arranged in a square configuration and a thermocouple element is arranged opposite to each of said four heaters outwardly thereof.

4. A method of manufacture according to claim 1 wherein said heater element comprises a single heater extending completely across said substrate and said etching of the substrate comprises using a gaseous isotropic etchant to perform said etching.

5. A method of manufacture according to claim 4 wherein the gaseous isotropic etchant comprises xenon-difluoride.

6. A method of manufacture according to claim 1 wherein said etching of said substrate comprises using an anisotropic etchant to perform said etching.

7. A method of manufacture according to claim 1 wherein the thermocouple elements include hot and cold thermocouple junctions and the substrate is etched up to the cold thermocouple junction so that the cold thermocouple junction remains on the substrate.

8. A batch process method of manufacture of convective accelerometer and tilt sensor devices, said method comprising:

providing an integrated circuit chip comprising a substrate having an integrated circuit pattern thereon comprising a plurality of separate sub-patterns each comprising a heater element and at least first and second thermocouple elements located on opposite sides of said heater element and further defining etching sites on said substrate; and using a maskless etching step to provide simultaneous etching of the substrate at the etching sites of all of the sub-patterns so as to etch away portions of the substrate around and under the heater and thermocouple elements of each sub-pattern to form a cavity therebeneath and to thereby suspend said elements of each sub-pattern so as to thermally isolate said elements from the substrate and so that an air gap contiguous with said cavity is formed between each said heater element and each of the respective said first and second thermocouple elements.

9. A method of manufacture according to claim 8 wherein said heater element of each sub-pattern includes a plurality of heaters arranged in a symmetrical pattern and wherein a thermocouple element is associated with each of said heaters.

10. A method of manufacture according to claim 9 wherein said plurality of heaters comprises four heaters arranged in a square configuration and wherein a thermocouple element is arranged opposite to each of said four heaters outwardly thereof.

11. A method of manufacture according to claim 8 wherein said heater element of each sub-pattern comprises a single heater and said etching of the substrate comprises using a gaseous isotropic etchant to perform said etching.

12. A method of manufacture according to claim 11 wherein the gaseous isotropic etchant comprises xenon-difluoride.

13. A method of manufacture according to claim 8 wherein said etching of said substrate comprises using an anisotropic etchant to perform said etching.

14. A method of manufacture according to claim 8 wherein the thermocouple elements of each sub-pattern include hot and cold thermocouple junctions and the substrate is etched up to the cold thermocouple junction so that the cold thermocouple junction remains on the substrate.

15. A method of manufacture according to claim 1 wherein the sensor device formed by the etching step is sealed within an enclosure so that when an acceleration is applied to the device, the inertia of air in the enclosure creates a temperature difference on opposite sides of said heater element.

16. A method of manufacture of a convective accelerometer and tilt sensor device, said method comprising:

providing an integrated circuit chip comprising a substrate having an integrated circuit pattern thereon including a heater element located centrally of said substrate and at least first and second thermocouple elements located on said substrate on opposite sides of said heater element; and etching away portions of the substrate surrounding and beneath the heater and thermocouple elements to suspend said element on said substrate so as to thermally isolate said elements from the substrate, said thermocouple elements including hot and cold thermocouple junctions and the substrate being etched up to the cold thermocouple junctions so that the cold thermocouple junctions remains on the substrate.

* * * * *